United States Patent
Jadhav

(10) Patent No.: US 11,038,810 B2
(45) Date of Patent: Jun. 15, 2021

(54) ACTIVE SUBSCRIBER COUNT BASED CHARGING AND POLICY CONTROL

(71) Applicant: Telefonaktiebolaget L M Ericsson (publ), Stockholm (SE)

(72) Inventor: Kiran Jadhav, Karlskrona (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 884 days.

(21) Appl. No.: 14/656,891

(22) Filed: Mar. 13, 2015

(65) Prior Publication Data
US 2016/0267138 A1    Sep. 15, 2016

(51) Int. Cl.
| | | |
|---|---|---|
| *H04L 12/923* | (2013.01) | |
| *H04L 12/911* | (2013.01) | |
| *H04L 12/927* | (2013.01) | |

(52) U.S. Cl.
CPC .......... *H04L 47/762* (2013.01); *H04L 47/822* (2013.01); *H04L 47/808* (2013.01)

(58) Field of Classification Search
CPC .... H04L 47/762; H04L 47/822; H04L 47/808
See application file for complete search history.

(56) References Cited

U.S. PATENT DOCUMENTS

| | | | | |
|---|---|---|---|---|
| 8,108,248 B2* | 1/2012 | Seuken | ................ | G06Q 10/087 705/7.35 |
| 8,165,021 B2* | 4/2012 | Jogalekar | ................ | H04L 47/10 370/230 |
| 8,391,836 B1* | 3/2013 | Bolot | ..................... | G06Q 30/02 455/408 |
| 8,700,662 B2* | 4/2014 | Cara | ................... | H04L 12/2874 707/781 |

(Continued)

FOREIGN PATENT DOCUMENTS

| | | |
|---|---|---|
| WO | WO 2011/082036 A2 | 7/2011 |
| WO | WO 2013/056366 A1 | 4/2013 |

OTHER PUBLICATIONS

Teng et al; "Mining Communities of Acquainted Mobile Users on Call Details Records"; National Cheng Kung University; Seoul, Korea; Mar. 11-15, 2007; (Year: 2007).*

(Continued)

*Primary Examiner* — Tonia L Dollinger
*Assistant Examiner* — Jihad K Boustany
(74) *Attorney, Agent, or Firm* — Sage Patent Group

(57) ABSTRACT

A method by a count database node monitors content of subscriber accounts processed by an online charging system in a communication network for user equipment nodes. The method includes receiving by the count database node a plurality of data records. Each data record contains a subscriber identifier and an attribute to be provisioned for the subscriber. For each of the data records, the data record is sorted for storage in database structures maintained by the count database node based on the attribute of the data record. The method further includes determining a count value based on a number of the data records stored in the database structures maintained by the count database node containing an attribute defined by a query received by the count database node, and providing the count value from the count database node to another node.

20 Claims, 12 Drawing Sheets

(56) References Cited

U.S. PATENT DOCUMENTS

| | | | | |
|---|---|---|---|---|
| 8,959,218 B2* | 2/2015 | Finkelstein | ........ | H04N 21/2402 709/203 |
| 2009/0187816 A1* | 7/2009 | Aureglia | ................ | G06F 40/18 715/218 |
| 2009/0288084 A1* | 11/2009 | Astete | ................ | G06F 9/45533 718/1 |
| 2010/0216424 A1* | 8/2010 | Gans | ................ | H04L 12/14 455/405 |
| 2011/0213653 A1* | 9/2011 | Mesaros | ................ | G06Q 30/00 705/14.35 |
| 2011/0218004 A1* | 9/2011 | Catovic | ................ | H04W 48/02 455/509 |
| 2011/0295577 A1* | 12/2011 | Ramachandran | ..... | H04W 4/025 703/6 |
| 2012/0099715 A1 | 4/2012 | Ravishankar et al. | | |
| 2013/0095784 A1* | 4/2013 | Jerath | ................ | H04W 12/06 455/406 |
| 2013/0159494 A1* | 6/2013 | Danda | ................ | H04L 41/5067 709/224 |
| 2014/0040975 A1 | 2/2014 | Raleigh et al. | | |
| 2014/0066004 A1* | 3/2014 | Shaik | ................ | H04L 12/1407 455/406 |
| 2014/0074539 A1* | 3/2014 | Doering | ............ | H04L 41/5054 705/7.25 |
| 2014/0324530 A1* | 10/2014 | Thompson | ......... | G06Q 30/0201 705/7.29 |
| 2015/0181415 A1* | 6/2015 | Raleigh | ................ | H04M 15/00 455/418 |
| 2015/0294337 A1* | 10/2015 | Poreh | ................ | G06Q 30/0283 705/7.34 |
| 2019/0026212 A1* | 1/2019 | Verkasalo | ........... | G06F 11/3438 |

OTHER PUBLICATIONS

International Search Report and Written Opinion Corresponding to International Application No. PCT/SE2016/050190; dated May 31, 2015; 14 Pages.

* cited by examiner

Entry for Attribute A, MSISDN 12345 is updated

Count Db

| Attribute A | | | Attribute B | | |
|---|---|---|---|---|---|
| Start Date | Expiry Date | MSISDN | Start Date | Expiry Date | MSISDN |
| 25-12-2014 01-00-01 | 26-12-2014 23-59-59 | 12346 | DD-MM-YYYY hh-mm-ss | DD-MM-YYYY hh-mm-ss | 12345 |
| 25-12-2014 01-30-01 | 26-12-2014 23-59-59 | 12347 | DD-MM-YYYY hh-mm-ss | DD-MM-YYYY hh-mm-ss | 12346 |
| 25-12-2014 02-00-01 | 26-12-2014 23-59-59 | 12348 | DD-MM-YYYY hh-mm-ss | DD-MM-YYYY hh-mm-ss | 12347 |
| 25-12-2014 02-30-01 | 26-12-2014 23-59-59 | 12349 | DD-MM-YYYY hh-mm-ss | DD-MM-YYYY hh-mm-ss | 12348 |
| 31-12-2014 23-00-01 | 01-01-2015 23-59-59 | 12345 | DD-MM-YYYY hh-mm-ss | DD-MM-YYYY hh-mm-ss | 12349 |

202

| Attribute C | | | Attribute D | | |
|---|---|---|---|---|---|
| Start Date | Expiry Date | MSISDN | Start Date | Expiry Date | MSISDN |
| DD-MM-YYYY hh-mm-ss | DD-MM-YYYY hh-mm-ss | 12345 | DD-MM-YYYY hh-mm-ss | DD-MM-YYYY hh-mm-ss | 12345 |
| DD-MM-YYYY hh-mm-ss | DD-MM-YYYY hh-mm-ss | 12346 | DD-MM-YYYY hh-mm-ss | DD-MM-YYYY hh-mm-ss | 12346 |
| DD-MM-YYYY hh-mm-ss | DD-MM-YYYY hh-mm-ss | 12347 | DD-MM-YYYY hh-mm-ss | DD-MM-YYYY hh-mm-ss | 12347 |
| DD-MM-YYYY hh-mm-ss | DD-MM-YYYY hh-mm-ss | 12348 | DD-MM-YYYY hh-mm-ss | DD-MM-YYYY hh-mm-ss | 12348 |
| DD-MM-YYYY hh-mm-ss | DD-MM-YYYY hh-mm-ss | 12349 | DD-MM-YYYY hh-mm-ss | DD-MM-YYYY hh-mm-ss | 12349 |

FIGURE 7

ACTIVE SUBSCRIBER COUNT BASED CHARGING AND POLICY CONTROL

FIELD OF INVENTION

The present invention relates to methods and apparatuses for controlling service traffic in a communication network.

BACKGROUND

As new services are being launched by telecommunications operators, it is becoming increasingly desirable to know how many active subscribers are using a particular service. Telecommunications operators could use this information to control congestion in the telecommunications network related to a service, to determine how much revenue is generated by a particular campaign or community group of subscribers, and to evaluate the effect on revenue by making changes in the service. Currently telecommunications operators are constrained to using statistical reports which are generated infrequently, such as daily, related to resource usage in the telecommunications network. Such coarse grain analysis has limited accuracy particularly when subscriber usage has rapid fluctuations.

SUMMARY

An object of the disclosure is to provide methods and apparatuses for generating real-time, network wide counts of active subscribers associated with a particular campaign, community, corporate group or using a particular offer. Various embodiment of the present disclosure provide an active subscriber count based on specific account attributes that is used as a condition to provide dynamic rates for the services used by the end-users. The total active subscriber count from the whole subscriber base of the operator can be tracked. Real-time statistics based on the count can be provided to the telecommunications operator on the efficiency of a particular campaign. Real-time congestion control in the network can be performed by the telecommunications operator based on real-time statistics generated from the count. A revenue-sharing model with business partners can be decided upon to allow the business partners to see trends for usage of different services in real-time based on the real-time statistics and to plan for the future accordingly. Ideas for new revenue streams and service charging models can be developed based on a real-time count of subscribers.

One embodiment of the present disclosure is directed to method by a count database node for monitoring content of subscriber accounts processed by an online charging system in a communication network for user equipment nodes. The method includes receiving by the count database node a plurality of data records. Each data record contains a subscriber identifier and an attribute to be provisioned for the subscriber. For each of the data records, the data record is sorted for storage in database structures maintained by the count database node based on the attribute of the data record. The method further includes determining a count value based on a number of the data records stored in the database structures maintained by the count database node containing an attribute defined by a query received by the count database node, and providing the count value from the count database node to another node.

Another embodiment of the present disclosure is directed to a method by a network node in a communication network for monitoring content of subscriber accounts for user equipment nodes. The method includes receiving data contained in a provisioning request to provision an attribute for use by the subscriber account having a subscriber identifier, generating based on the data contained in the provisioning request, a data record containing the subscriber identifier for the subscriber account and containing the attribute to be provisioned, and providing the data record to a count database node via the network interface for sorting of the data record for storage in a database structure maintained by the count database node based on the attribute of the data record.

Another embodiment of the present disclosure is directed to a method by a policy and charging node in a communication network for controlling communications by user equipment nodes associated with subscriber accounts. The method includes receiving a count value indicating a number of data records having a defined attribute that are stored in a database structure maintained by a count database node, and applying a policy that controls use of the service related to the attribute based on the count value.

Other methods, count database nodes, online charging systems, multi-mediation nodes, and policy and charging nodes according to embodiments of the invention will be or become apparent to one with skill in the art upon review of the following drawings and detailed description. It is intended that all such methods, count database nodes, online charging systems, multi-mediation nodes, and policy and charging nodes be included within this description, be within the scope of the present invention, and be protected by the accompanying claims.

BRIEF DESCRIPTION OF THE DRAWINGS

The accompanying drawings, which are included to provide a further understanding of the disclosure and are incorporated herein and constitute a part of this application, illustrate certain non-limiting embodiments of inventive concepts. In the drawings:

FIG. 2-10 are block diagrams showing data flows and operations performed by elements of the Policy and Charging Control system of FIG. 1 according to some embodiments of the present disclosure.

DETAILED DESCRIPTION

In the following detailed description, numerous specific details are set forth in order to provide a thorough understanding of embodiments of the invention. However, it will be understood by those skilled in the art that the present invention may be practiced without these specific details. In other instances, well-known methods, procedures, components and circuits have not been described in detail so as not to obscure the present invention. It is intended that all embodiments disclosed herein can be implemented separately or combined in any way and/or combination.

Various embodiments of the present disclosure are directed to generating a real-time count across an entire telecommunications network of the number of active subscribers that are using a particular campaign, community group, or service. In some embodiments, the real-time count of the active subscribers associated with promotional or other services is used to dynamically determine the charging rate and/or to charge for usage of that service. The count can be used to dynamically apply different policy decisions based on the total count of subscribers having specific common account attribute or attributes at a defined point in time. The real-time count is used to provide more accurate analysis during rapidly fluctuating subscriber usage of a particular campaign, community group, or service.

Potential Advantages of Various Embodiments

The potential advantages of various embodiment of the present disclosure can include providing operations for obtaining a real-time, network wide count of active subscribers associated with a particular campaign, community, corporate group or using a particular offer. An active subscriber count based on specific account attributes, can be used as a condition to provide dynamic rates for the services used by the end-users. The total active subscriber count from the whole subscriber base of the operator can be tracked. Real-time statistics based on the count can be provided to the telecommunications operator on the efficiency of a particular campaign. Real-time congestion control in the network can be performed by the telecommunications operator based on real-time statistics generated from the count. A revenue-sharing model with business partners can be decided upon to allow the business partners to see trends for usage of different services in real-time based on the real-time statistics and to plan for the future accordingly. Ideas for new revenue streams and service charging models can be developed based on a real-time count of subscribers.

Figure 1:
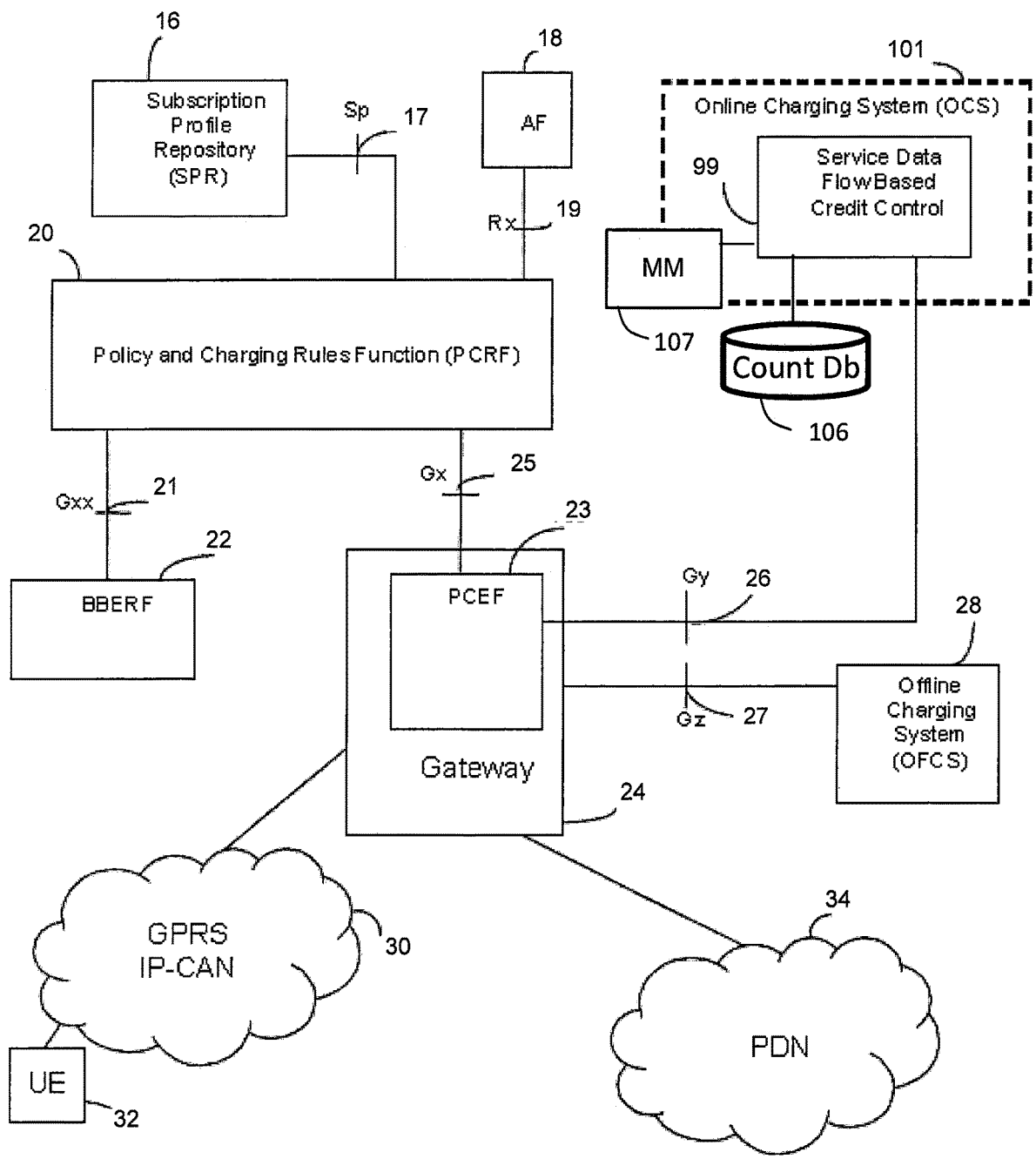
FIG. 1 is a block diagram showing a Policy and Charging Control system that includes a count database node, an online charging system, and a policy and charging node configured according to some embodiments of the present disclosure.

System Overview:

FIG. 1 is a block diagram showing a Policy and Charging Control (PCC) system 10 that may be based, in part, on 3GPP TS 23.203 to operate allowing a User Equipment (UE) 32 access to a Packet Data Network (PDN) 34 via a gateway 24 having a policy and charging enforcement function (PCEF) 23.

The Rx reference point 19 connects an Application Function (AF) 18 and a Policy and Charging Rules Function (PCRF) 20. This reference point enables transport of application level session information from the AF 18 to the PCRF 20. The Gx reference point 25 connects the Policy and Charging Enforcement Function (PCEF) 23 of the gateway 24, e.g. a GPRS Gateway Support Node GGSN, and the PCRF 20 and enables the PCRF 20 to have dynamic control over the PCC system 10 behavior at the PCEF 23. The Gx reference point 25 enables the signaling of PCC system 10 decisions, which governs the PCC system 10 behavior.

The Gxx reference point 21 connects the Bearer Binding and Event Reporting Function (BBERF) 22 and the PCRF 20. The Gxx reference point 21 enables the PCRF 20 to have dynamic control over the BBERF 22 behavior. The Sp reference point 17 connects the Subscription Profile Repository (SPR) 16 and the PCRF 20. The Sp reference point 17 allows the PCRF 20 to request subscription information related to the IP-CAN 30 transport level policies from the SPR 16 based on a subscriber ID, a Packet Data Network PDN identifier and possible further IP-CAN session attributes.

The Gy reference point 26 connects the Service Data Flow Based Credit Control component 99 of an Online Charging System (OCS) 101 and the PCEF 130. A multi-mediation (MM) node 107 may be connected to or included within the OCS 101. The Gy reference point 26 allows online credit control for service data flow based charging.

The Gz reference point 27 connects the PCEF 23 and the Offline Charging System OFCS 28 and enables transport of service data flow based offline charging information.

Further operations and methods that may be performed by the PCC system 10 are explained in 3GPP TS 23.203. In accordance with embodiments of the present disclosure, the PCC system 10 includes a count database (Db) node 106 that can be used to generate a real-time count across an entire telecommunications network of the number of active subscribers that are using a particular campaign, community group, or service. The count database node 106 is connected to the OCS 101. Although a single OCS 101 is illustrated for convenience, a PCC 10 typically has many OCS 101 nodes. The count database node 106 is connected to each of the OCS 101 nodes to provide a real-time count across the entire PCC system 10.

Alternatively, some or all of the functionality disclosed herein for a count database node 106 may be distributed locally with the OCS 101 nodes, with a centralized count across the system 10 being generated based on accessing each of the count database nodes 106. For ease of illustration, and without limitation, a centralized count database node 106 is illustrated and described below.

Updating and Operating the Count Database:

Methods and operations are disclosed for using the count database node 106 to provide a real-time count of subscribers associated with a particular account attribute, and which can be used in various disclosed ways as an operational condition in the rating of services. The count generated for active subscribers using specific, common account attribute or attributes can be used to apply different policy rules for a service being used.

Two alternative example approaches are described below regarding operations and methods for updating the count database node 106.

Figure 2:
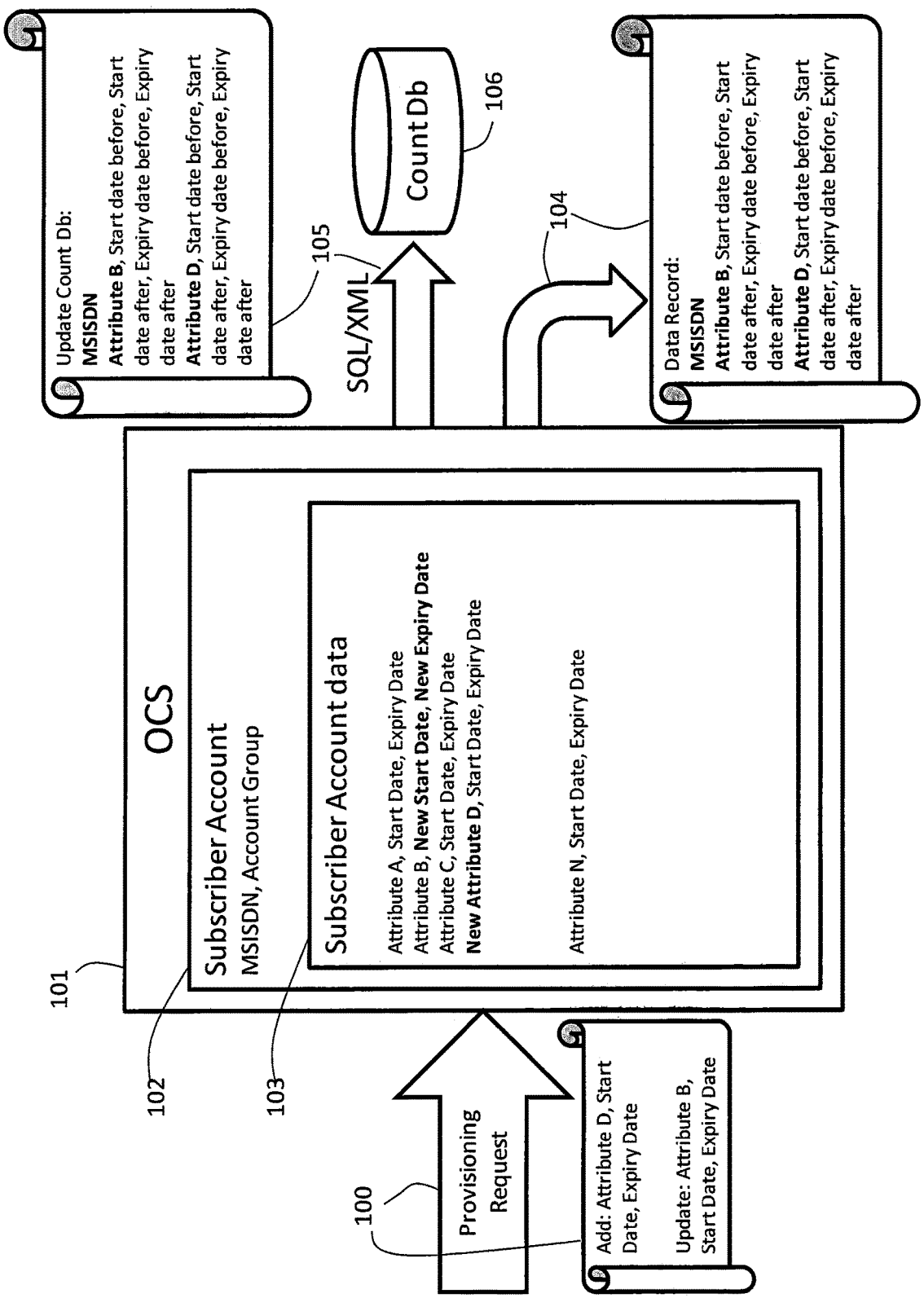
Figure 3:
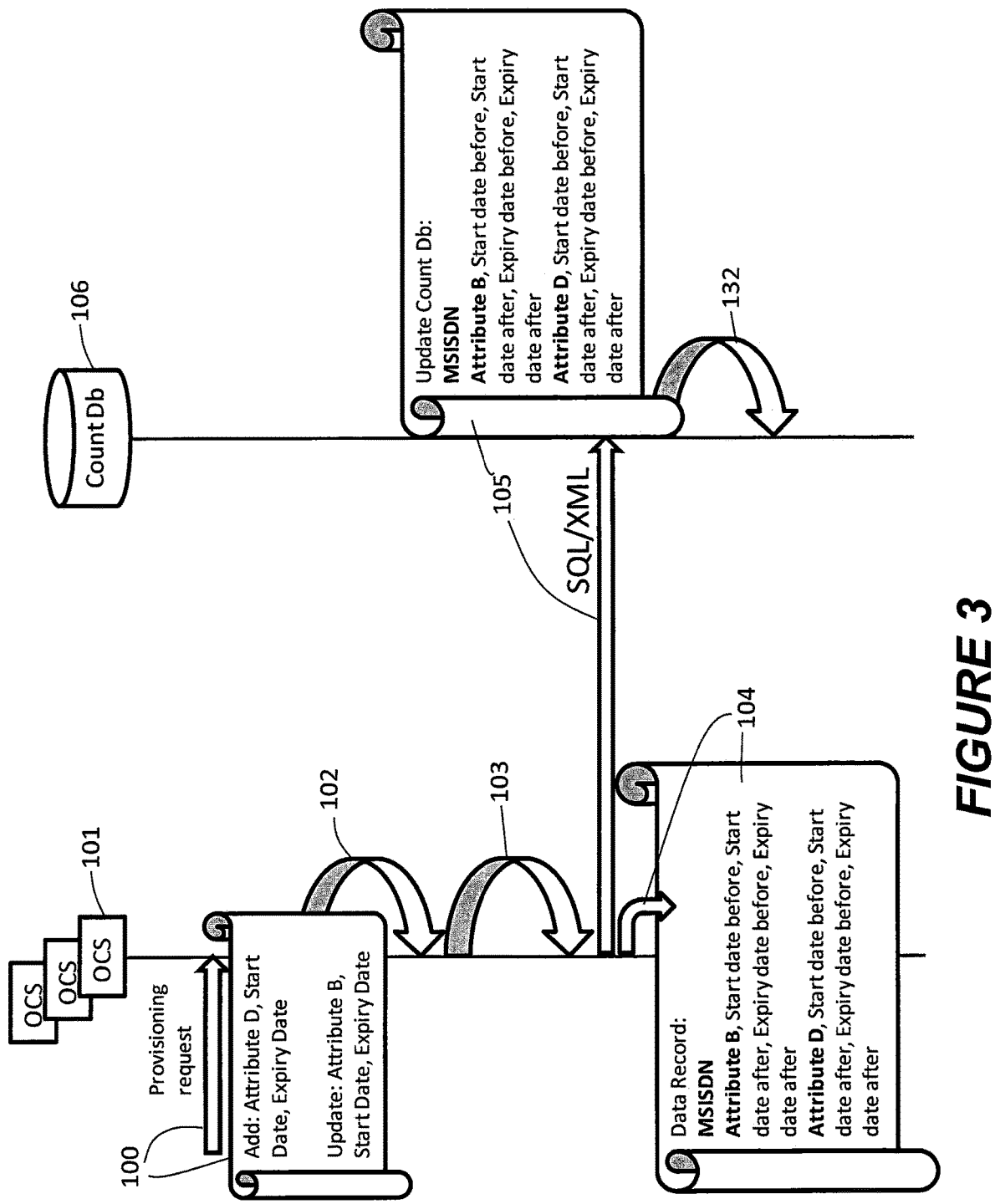

First Approach to Update Count Database Node:

FIGS. 2 and 3 are block diagrams showing data flows and operations performed by the OCS 101, the count database node 106, and other components of the PCC 10 to update a count of subscribers associated with a particular account attribute, in accordance with a first approach.

Referring to FIGS. 2 and 3, a provisioning request is received (step 100) by one of a plurality of OCS 101 nodes. The provisioning request forms a data record that contains a subscriber identifier (subscriber account data) and an attribute to be provisioned for the subscriber. The OCS 101 contains the subscriber account for which the request is sent. The subscriber account is identified (step 102) based on the Mobile Station International Subscriber Directory Number (MSISDN) and account group identifier to which the subscriber belongs.

The subscriber account data is checked (step 103). The subscriber account data contains information about all the attributes that are provisioned and available for the subscriber account. Updates pursuant to the provisioning requests are performed on the subscriber account data.

Responsive to any changes being made to the subscriber account, the OCS 101 generates (step 104) a data record about the changes made with the before and after values of the attributes that were changed. The information that is output in the data records from step 104 is also sent (step 105) to the count database node 106 using, for example, structured query language messaging or extensible markup language messaging to update the active subscriber count based on the changes that were identified by the provisioning request. Because the count database node 106 can be updated (step 105) immediately when provisioning is performed, the data contained in the count database node 106 tracks in real-time provisioning changes to the OCS 101.

Figure 4:
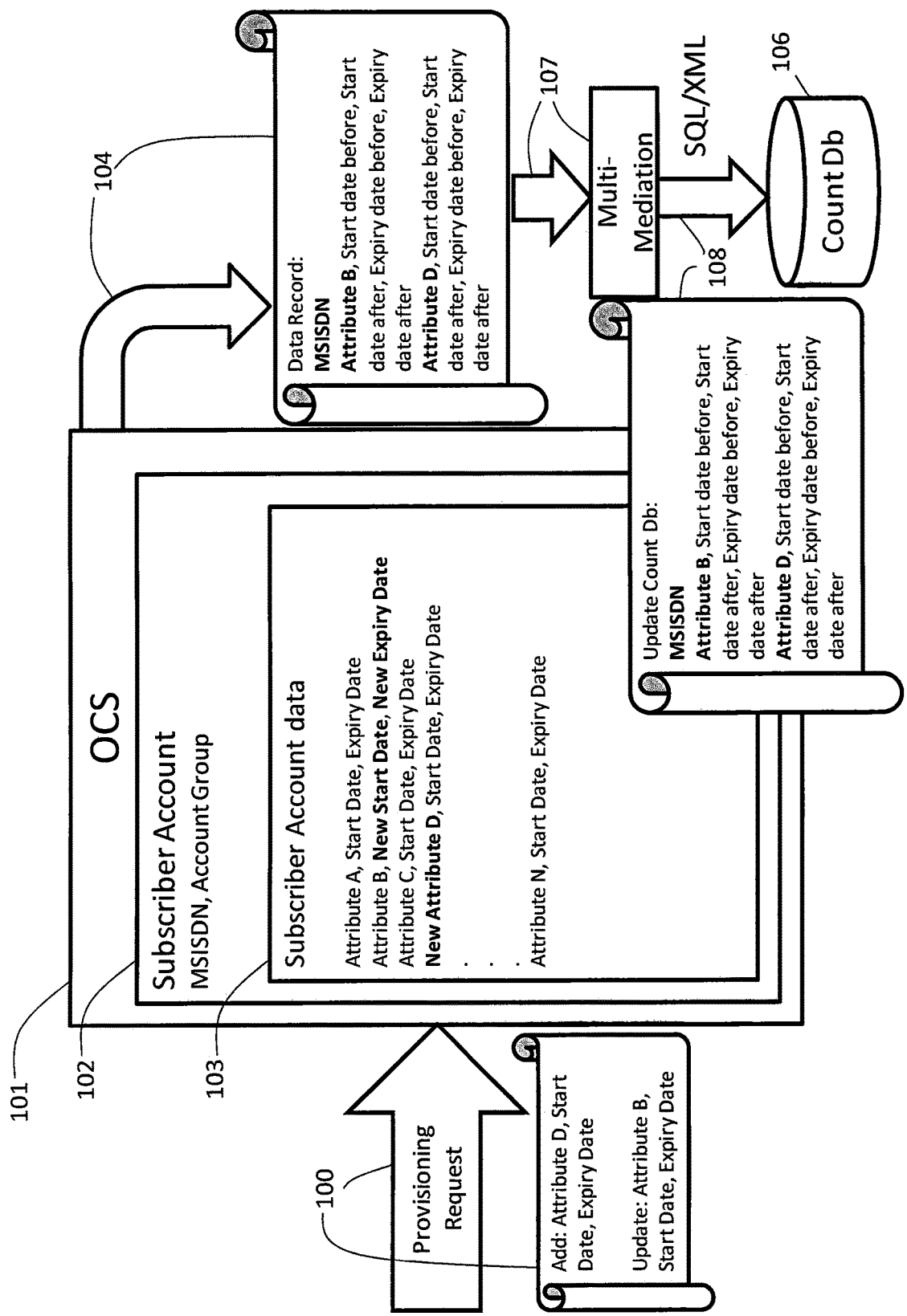
Figure 5:
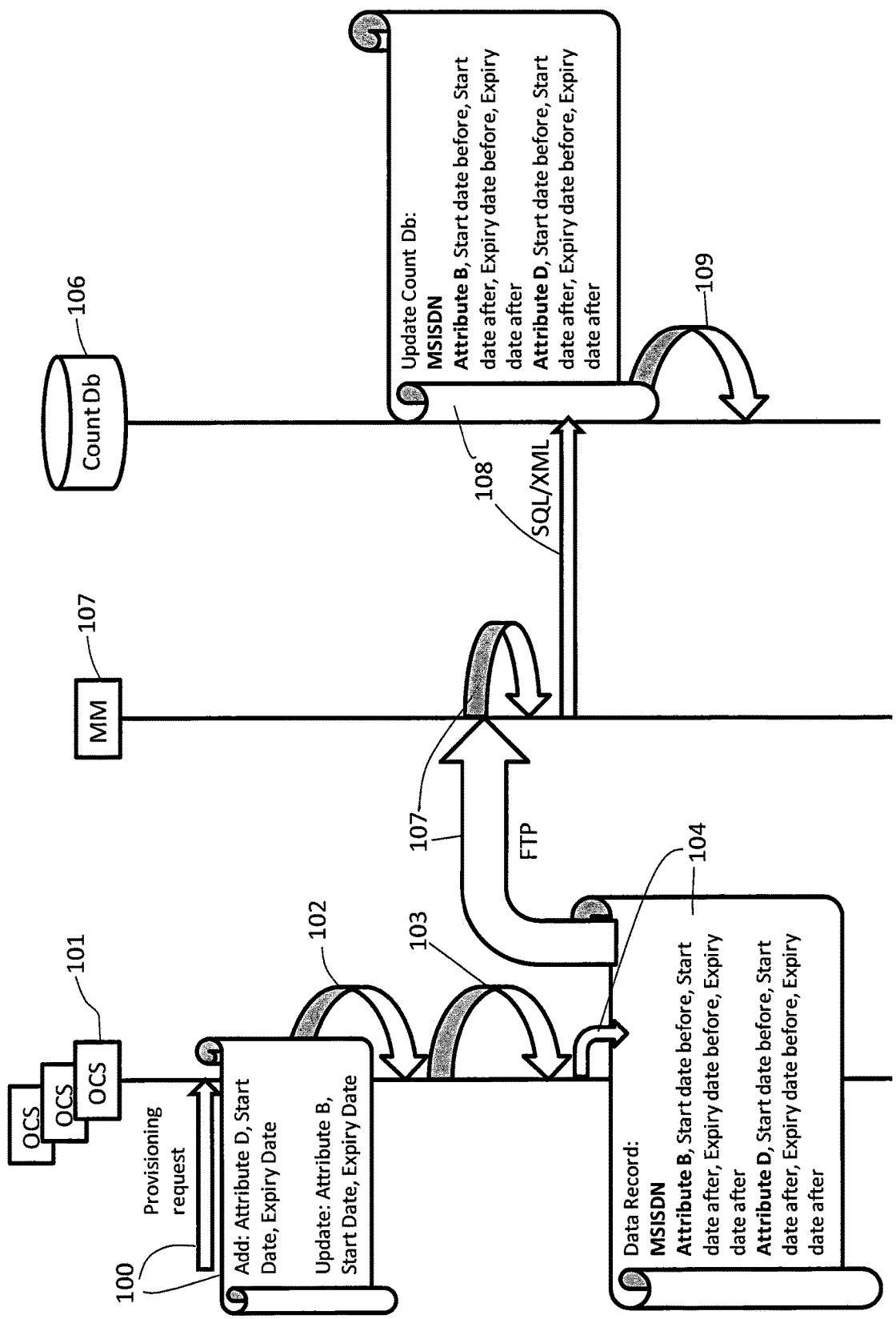

Second Approach to Update Count Database Node:

In contrast to the first approach for updating the count database node 106, FIGS. 4 and 5 are block diagrams showing data flows and operations performed by the multi-mediation (MM) node 107, the OCS 101, the count database node 106, and other components of the PCC 10 to update a count of subscribers associated with a particular account attribute in accordance with a second approach that can alternatively be performed.

Referring to FIGS. 4 and 5, the OCS 101 includes subscriber account information 102 (data records) organized by MSISDN and account group, which contain subscriber account data 103 having attribute identifiers (e.g., A, B, C, etc.), start time, and expiry time entries. The term "time" refers to a time of day and/or a calendar date. Start time and expiry time entries can be provided as absolute date and/or time, e.g. 2015.12.31, 2015.12.31; 2015.12.31 08:00:00 or 08:00:00. Start time and expiry time entries can additionally or alternatively be provided as relative date and/or time, e.g. start/expiry within 15 days or by 12 pm in 2 days.

The multi-mediation node 107 operates to update the count database node 106 using CDRs generated by the OCS 101 for provisioning and updating attributes of subscriber accounts. A provisioning request is received (step 100) by one of a plurality of OCS 101 nodes. The provisioning request forms a data record that contains a subscriber identifier (subscriber account data) and an attribute to be provisioned for the subscriber. The OCS 101 contains the subscriber account for which the request is sent. The subscriber account is identified (step 102) based on the MSISDN and account group identifier to which the subscriber belongs.

The subscriber account data is checked (step 103). The subscriber account data contains information about all the attributes that are provisioned and available for the subscriber account. Updates pursuant to the provisioning requests are performed on the subscriber account data.

Responsive to any changes being made to the subscriber account, the OCS 101 generates (step 104) a data record about the changes made with the before and after values of the attributes that were changed. The information that is generated (step 104) is processed by the multi-mediation node 107 which operates to gather information of the MSISDN and attributes that should be updated in the count database node 106. At every pre-configured interval, the multi-mediation node 107 sends (step 108) update request using structured query language messaging or extensible markup language messaging to the count database node 106 to update the active subscriber count based on the changes that were done by the provisioning request. Because the count database node 106 can be updated (step 108) in near real-time when provisioning is performed, the data contained in the count database node 106 tracks near real-time provisioning changes to the OCS 101.

Figure 6:
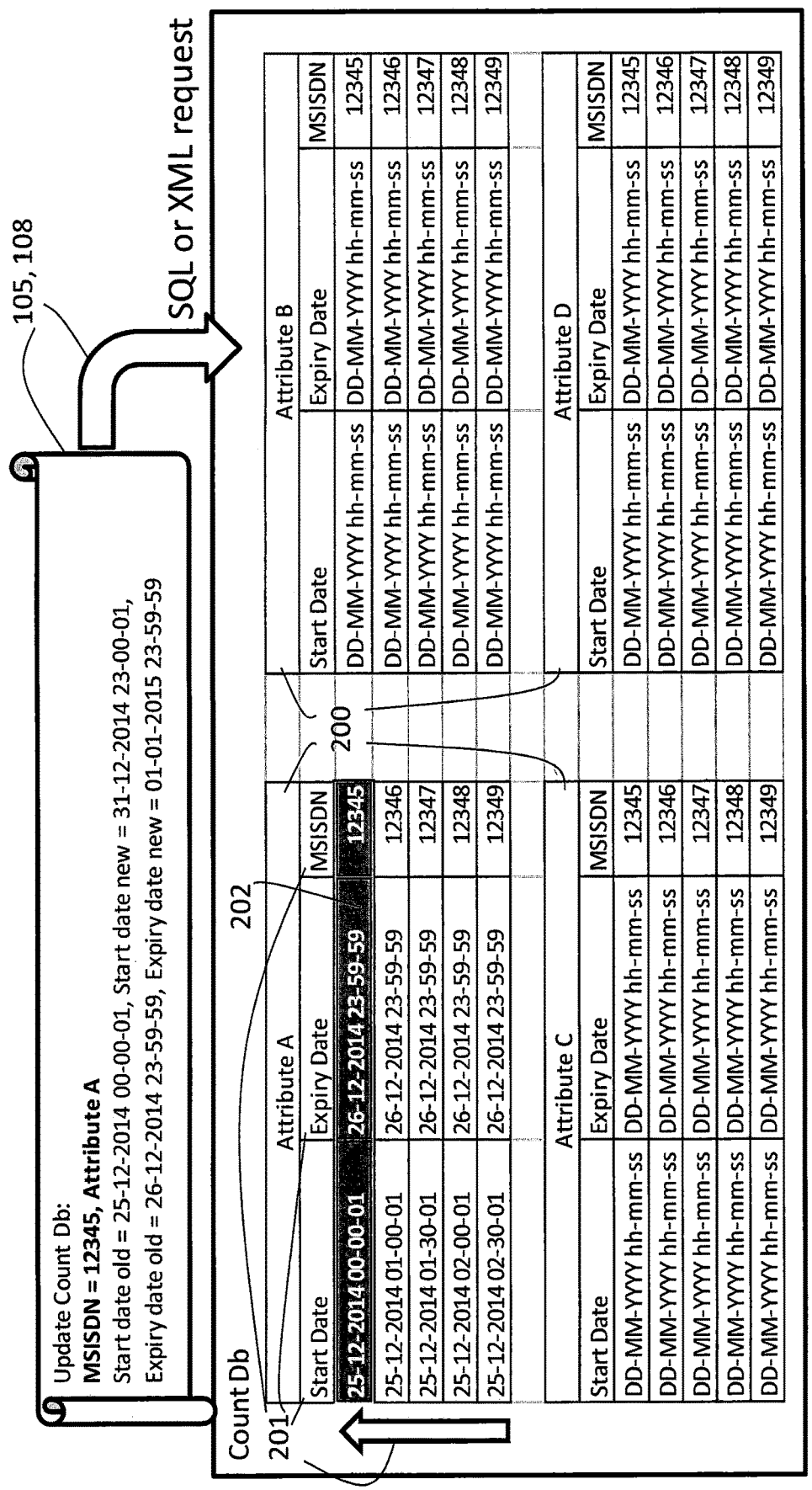

Sorting and Processing Data in the Count Database Node:

Once the count database node 106 has been built (updated) as explained with regard to FIGS. 3 and 4 or FIGS. 5 and 6, the count database node 106 can be continuously updated to store and sort information received from the OCS 101. FIGS. 6 and 7 illustrate operations and methods that group and sort information contained in database structures of the count database node 106 based on, for example, structured query language messaging or extensible markup language messaging updates from the OCS 101 or the multi-mediation node 107. FIG. 6 illustrates database structures having data records each containing a start time when the attribute will become active for use, an expiry time when the attribute will become inactive, and a MSISDN. FIG. 7 illustrates the result of sorting the data records in the database structures of FIG. 6 responsive to an update request is received from the OCS 101 or the multi-mediation node 107 according to some embodiments.

Referring to FIGS. 6 and 7, the request to update the count database node 106 is sent from the OCS 101 or the multi-mediation node 107 based on changes that have occurred on the account attribute. As an example, the request shows how the position of a MSISDN is changed, sorted, (steps 105 and 108) in a database structure of the count database node 106 for attribute "A". Data records in the data structures of the count database node 106 are grouped (step 200) based on their attributes for which the subscriber count should be generated and/or based on time of the notifications to be sent. The sorting of data records in the data structures for each attribute group can be performed (step 201) based on their attribute start date, then based on their attribute expiry date, and then based on their MSISDN. Alternatively, the data records in the data structures may be sorted based on other sequentially selected ones of their attribute start date, attribute expiry date, and MSISDN.

When an update request is received by the count database node 106 (step 105 or 108), the count database node 106 may first check for the contained attribute value, then for the MSISDN in that attribute group. Then, based on the start time being before a defined time (e.g., present date and time of day), start time after the defined time, expiry time before the defined time, and expiry time after the defined time, the position of the data record in the data structure for that MSISDN is change based on the sorting explained above for step 201. Sorting of data records in the data structures contained in the count database node 106 in this manner may ensure that the data record entries who's start times and/or expiry times are near a present time are always logically presented higher in position within the data structure then the other data record entries. Once the expiry time for an attribute has passed, the corresponding data record can be purged from the count database node 106.

In one embodiment, an attribute entry, contained in the database structure group for the attribute, is included in a count of active subscribers for the account attribute only if the following condition is true:

Attribute start date & time of day<=current date & time of day, and

Attribute expiry date & time of day=>current date & time of day.

Thus, when a query is made to the count database node 106 on the 25 Dec. 2014 at 10:00 am for attribute "A", then, based on the data records shown in the data structure of FIG. 7, the count database node 106 will return a count for attribute "A" of 4.

It is noted that if no start time or expiry time is defined for an attribute, then that attribute may be considered as active when provisioned. The count database node 106 can be updated immediately to reflect that attribute as being active responsive to the provisioning of the attribute.

Using the Count from the Count Database Node as a Condition in Rating, Charging, and Policy Control:

Operations and methods are now described for how a count of data records contained in data structures of the count database node 106 can be generated and used as an operational condition for rating and charging of services and/or as an operational condition in policy control.

Figure 8:
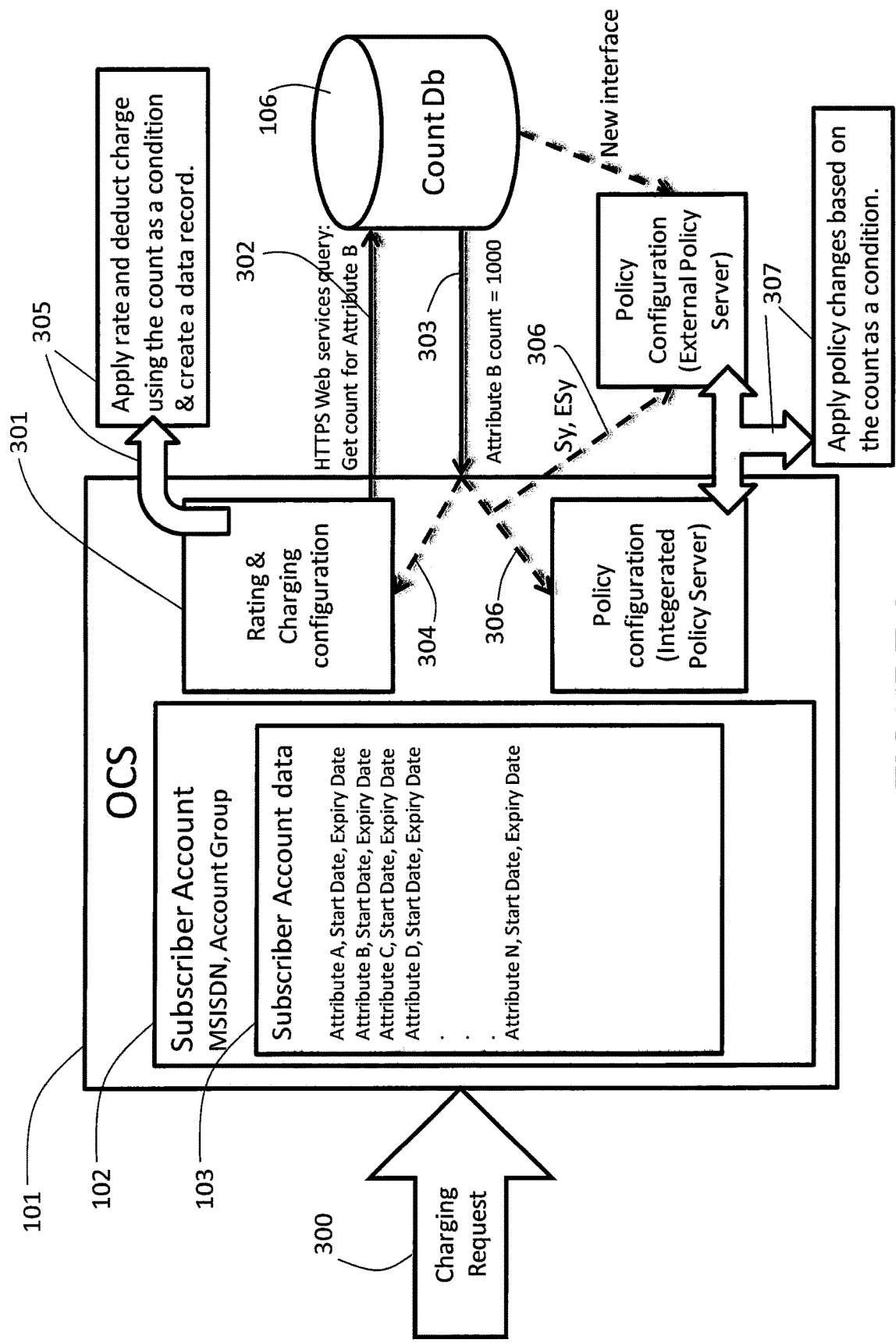
Figure 9:
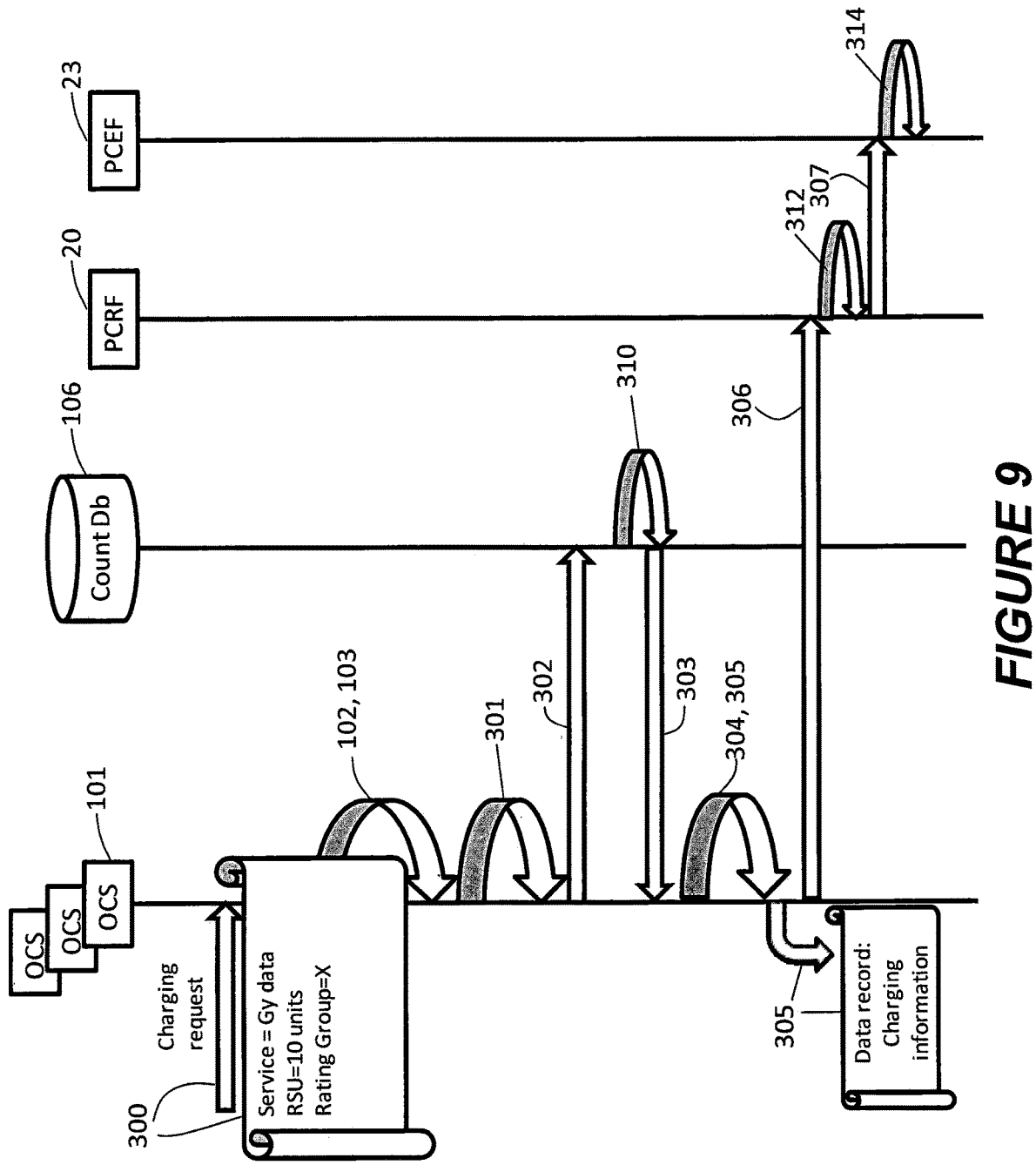

Reference is now made to the block diagrams of FIGS. 8 and 9 which show operations and methods for service rating, charging and policy control using a count generated from the count database node 106. A service charging request is received (step 300) by the OCS 101. The OCS analyzes (step 301) information that was received (step 300), information available from the subscriber account 102 and subscriber account data 103.

Based on the analysis (step 301), the OCS 101 sends (block 302) a Hypertext Transfer Protocol Secure (HTTPS) web services query to the count database node 106 to fetch the current count for a specific attribute. The count database node 106 calculates the number of active subscribers having the attribute that is received (step 302), such as based on the condition explained in the previous section for generating a count of active subscribers.

The generated count for the requested attribute is returned (step 303) in a HTTPS web services response to the OCS 101. The count received from the count database node 106 is used (step 304) as a condition to calculate the differential rate for the service at that point in time. The charge for the service is deducted (step 305) based on the rate that is calculated (step 304).

The received count may alternatively or additionally be used (step 306) as a condition in the internal integrated policy service or may be sent over a Sy interface or other interface (e.g., Ericsson defined Sy interface (ESy)) to an external policy server where it can be used as an operational condition for policy determination and control.

The policy determined based on the count may then be applied (step 307) to the service session for the current subscriber or can be applied to all the ongoing service sessions of the subscribers sharing/having the same account attribute.

Figure 10:
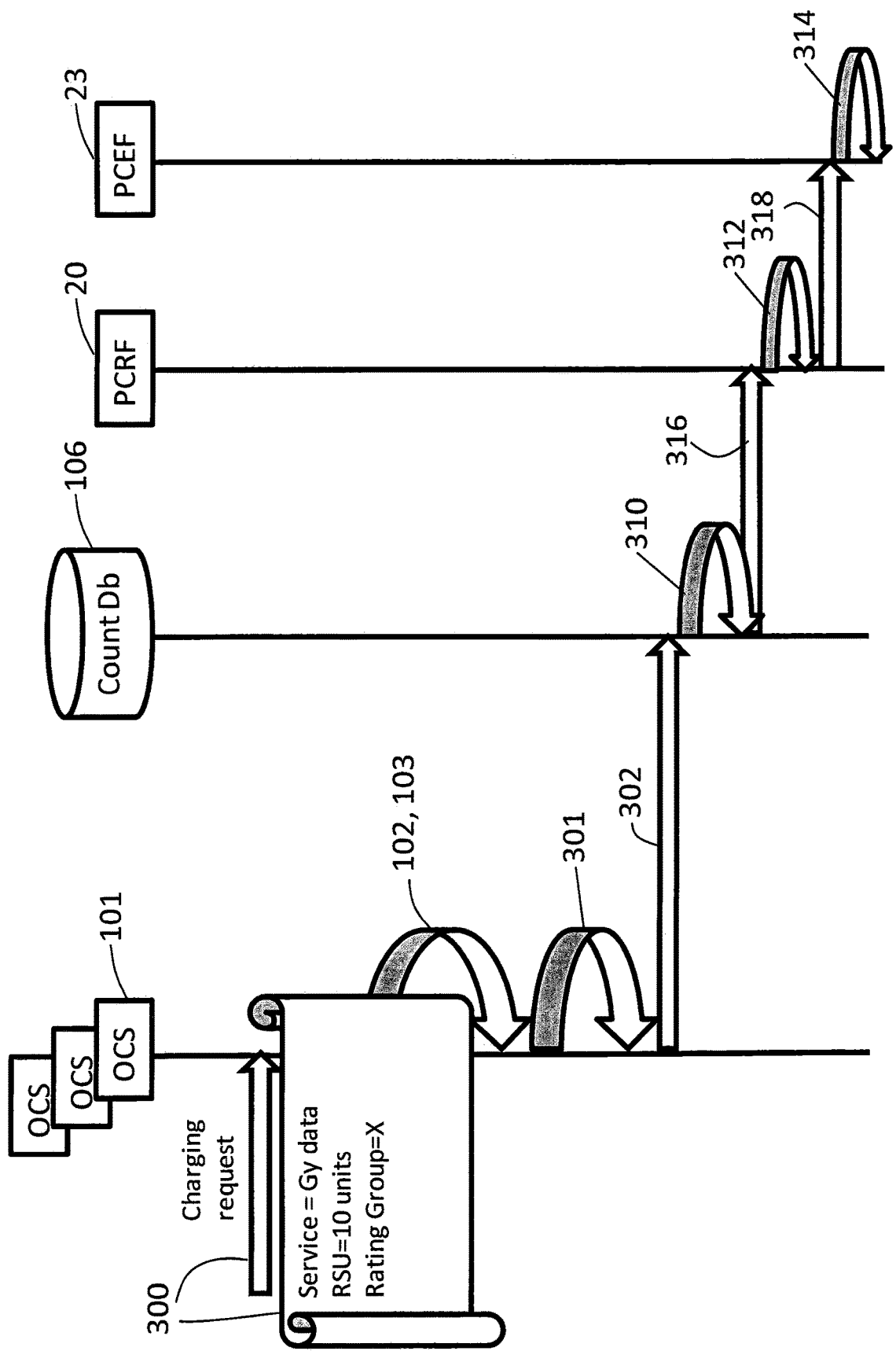

FIG. 10 illustrates alternative operations and methods that may be performed in place of those illustrated in FIG. 9. FIG. 10 differs from FIG. 9 by operation of the PCRF 20 which directly fetches (step 316) the count from the count database 106 without involving the OCS 101.

Further Operations and Methods of the Count Database, OCS, Multi-Mediation Node, and Policy and Charging Node:

Based on FIGS. 2-10, methods by a count database node 106 for monitoring content of subscriber accounts processed by an OCS 101 in a communication network for user equipment nodes 32, includes receiving (steps 105 or 108) by the count database node 106 a plurality of data records. Each data record contains a subscriber identifier and an attribute to be provisioned for the subscriber. For each of the data records, sorting (step 132) is performed on the data record for storage in database structures 200 maintained by the count database node 106 based on the attribute of the data record. The method further includes determining (step 310) a count value based on a number of the data records stored in the database structures 200 maintained by the count database node 106 containing an attribute defined by a query received (steps 302 or 318) by the count database node 106, and providing (steps 303 or 318) the count value from the count database node 106 to another node 101 or 20.

The step 105 of receiving by the count database node 106 the plurality of data records, can include receiving the data records from the online charging system through structured query language messaging or extensible markup language messaging.

The step 108 of receiving by the count database node 106 the plurality of data records, can include receiving the data records from a multi-mediation node 107 through structured query language messaging or extensible markup language messaging, the data records received from the multi-mediation node 107 are based on data records containing subscriber account data provided by the online charging system 101 to the multi-mediation node 107.

At least some of the data records received by the count database node 106 further contain a start time when the attribute will become active for use and an expiry time when the attribute will become inactive. The step 310 of determining the count value can further include determining the count value based on how many of the data records stored in the database structures contain the attribute defined by the query, the start time before a current time, and the expiry time after the current time. Expired ones of the data records can be purged from the database structures maintained by the count database node 106 based on associated ones of the expiry times becoming after the current time which indicates the associated ones of the attributes have become inactive.

At least some of the data records received by the count database node 106 further contain a start time when the attribute will become active for use and an expiry time when the attribute will become inactive. The method can further include sorting (steps 109 or 201) an order of the data records stored in the database structures maintained by the count database node 106 based on the start time when the attribute of the data record will become active for use and then based on the expiry time when the attribute of the data record will become inactive. Following the sorting of the order of the data records based on the start time and then based on the expiry time, further sorting (step 109 or 201) can be performed to the order of the data records stored in the database structures maintained by the count database node 106 based on the subscriber identifier. The subscriber identifier may be a MSISDN.

The query include a services query received from the online charging system 101, and the step 303 of providing the count value from the count database node 106 to another node 101 or 20, can include providing the count value from the count database node 106 to the online charging system 101 responsive to the services query.

The query can be received (step 316) from a policy and charging rules function node 20, and the step 316 of providing the count value from the count database node 106 to another node 20, can include providing the count value from the count database node 106 to the policy and charging rules function node 20 responsive to the query.

Corresponding methods by a network node 101 or 107 in a communication network for monitoring content of subscriber accounts for user equipment nodes 32, can include receiving (step 100) data contained in a provisioning request to provision an attribute for use by the subscriber account having a subscriber identifier, and generating (step 102) based on the data contained in the provisioning request, a data record containing the subscriber identifier for the subscriber account and containing the attribute to be provisioned. The data record is providing (step 105 or 108) to a count database node 106 via the network interface for sorting of the data record for storage in a database structure 200 maintained by the count database node (106) based on the attribute of the data record.

The network node can include an online charging system 101. The provisioning request can be received (step 100) by the online charging system 101. The step 105 of providing the data record to the count database node 106, can include providing the data record through structured query language messaging or extensible markup language messaging from the online charging system 101 to the count database node 106. The method can further include receiving (step 300) a charging request containing an attribute, querying (step 302) the count database node 106 using a services query to obtain a count value based on a number of the data records stored in one of the plurality of database structures maintained by the count database node 106 that have the attribute contained in the charging request. The method can further include calculating (step 304) a differential charging rate, for a service requested in the charging request, based on the count value that is related to the attribute on the subscriber account, and applying (step 305) the differential charging rate for use of a service defined by the attribute on the subscriber account.

The step 102 of generating based on the data contained in the provisioning request, a data record containing the subscriber identifier for the subscriber account and containing the attribute to be provisioned, can include generating (step 102) the data record to further contain a start time when the attribute will become active for use and an expiry time when the attribute will become inactive. The querying (step 302) of the count database node 106 using the services query, to include obtaining a count value based on a number of the data records stored in the database structures maintained by the count database node 106 that have the attribute related to the service requested in the charging request and have the start time before a current time and the expiry time after the current time.

The method can further include receiving (300) a charging request for a service related to an attribute, and querying (step 302) the count database node 106 using a services query to obtain a count value based on a number of the data records stored in the database structure maintained by the count database node (106) that has the attribute related to the service requested in the charging request. The count value can be communicated (step 306) to a policy and charging rules function node 20 for applying (step 312) a policy that controls use of the services related to the attribute by the subscriber based on the count value.

The network node can include a multi-mediation node 107. The step 108 of providing the data record to the count database node 106, can include providing the data record through structured query language messaging or extensible markup language messaging from the multi-mediation node 107 to the count database node 106.

Methods by a policy and charging node 20 or 23 in a communication network for controlling communications by user equipment nodes 32 associated with subscriber accounts, can include receiving (step 306, 316, or 318) a count value indicating a number of data records having a defined attribute that are stored in a database structure 106 maintained by a count database node 106, and applying (step 312 or 314) a policy that controls use of the service related to the attribute based on the count value.

The step 316 of receiving a count value indicating a number of data records having a defined attribute that are stored in a database structure 106 maintained by a count database node 106, can include querying (step 316) the count database node 106 using a query containing the attribute.

The step 312 or 314 of applying a policy that controls use of the service related to the attribute based on the count value, can include controlling quality of service provided to the user equipment nodes 32 for use of the service related to the attribute, based on the count value. The step 312 or 314 of applying a policy that controls use of the service related to the attribute based on the count value, may alternatively or additionally include limiting a number of the user equipment nodes 32 allowed for concurrent use of the service related to the attribute, based on the count value. The step 312 or 314 of applying a policy that controls use of the service related to the attribute based on the count value, may alternatively or additionally include controlling bandwidth and/or channels allocated to the user equipment nodes 32 for use of the service related to the attribute, based on the count value.

Example Dynamic Service Charging Using Count of Total Subscribers Associated with an Account Attribute:

The system operates so the rate used to charge for a service within a community is dynamically adjusted based on the total count of the active subscribers belonging to the community at a defined time, in accordance with some embodiments. For example, when the count of subscribers using services through a defined communities between 101-200 the rate is charged for those services is 10 SEK/min. in contrast, when the number of subscribers in that community increases so that the count is between 201-300 the rate charge for those services becomes 7 SEK/min. The methods and operations disclosed herein for obtaining a real-time count or near real-time count of active subscribers having a common account level attribute is used to provide this dynamic rate adjustment.

Example Dynamic Service Charging Using Count of Total Subscribers Associated with a Time-Based Account Attribute:

The system operates so the rate used to charge for a service provided through a time-limited offer is dynamically adjusted based on the total count of the active subscribers subscribing to that offer at a defined time, in accordance with some embodiments. By way of illustrative example, an operator desires to promote a particular sports event in view of the operator's business relationship with the sports event. To encourage the operator's subscribers to watch the sports event and to create interest in the promotional offer, the operator advertises the dynamic rates for the data services using this particular offer which will be used to stream the live sports event to the subscribers' user equipment. The services are provided through a limited time offer. The greater the number of subscribers using this promotional offer, the cheaper the data rates become. So, for example when the subscriber count for the offer is between 101-200, the rate is automatically adjusted to be 10 SEK/10 Mb. In contrast when the number of subscribers using this offer increases to between 201-300 the rate discharge for the data service to watch the sports event is adjusted to be 7 SEK/10 Mb. The rate can be adjusted to continue to decrease when further defined higher thresholds of subscribers are determined through the count to be watching the sports event.

The total count of the subscribers using the offer therefore serves as an additional condition which is not subscriber account related and provide a basis for differential rate charging for the service to a particular subscriber. The challenge with providing this differential rate charging for a limited time offer is that subscribers may purchase offer well in advance before the starting date and time of the sports event. This creates a potential issue in real-time counting of the active subscribers as these limited time offers for each subscriber may have a different start and expiry date and time. The provisioning/administration data records are generated in the subscriber's account data only at the time of provisioning this Offer and not when the offer becomes active, i.e., when the start date and time arrives. However, the methods and operations disclosed herein for obtaining a real-time count or near real-time count of active subscribers having a common account level attribute can be used to provide this dynamic rate adjustment.

Example "Crowd Funded" Calls & Services:

The system operates to provide calls or services that are free for a limited time, to a subscriber or a limited number of subscribers which do not have enough credits to complete the call or service, so long as they belong to a defined group, campaign or offer and if the currently active subscribers in that defined group, campaign or offer satisfies a defined threshold number. The cost of the call or service provided for free to the subscriber is distributed amongst the other active subscribers by dynamically changing the rate for the call or service.

For example, when a subscriber does not have a sufficient balance in the subscriber's account to cover the charge of the call or service, but the subscriber has an offer which 1 million other subscribers are using at that time, then operational logic in the SDP can allow the service to that subscriber for a limited amount time even though the subscriber does not have a sufficient balance. This operation will be based on how long that subscriber has been a customer (e.g., loyalty bonus) and the total number of active subscribers using that same offer at that time. The methods and operations disclosed herein for obtaining a real-time count or near real-time count of active subscribers can be used to provide this "crowd funded" type call or service control.

Example Policy Control Using the Count of Total Active Subscribers Associated with a Particular Service, Campaign, Corporate Business, or Offer:

The system operates based on the total number of active subscribers using a particular offer, community or campaign to dynamically adjust in real-time: 1) the quality of service (QoS) for data service of each associated subscriber in order to distribute the associated available bandwidth and avoid congestion in the network; 2) limit the number of concurrent subscribers using the service; and/or 3) increase or decrease the bandwidth or channels associated with a specific service based on the number of concurrent subscribers using that service and thereby optimize the network utilization real-time.

Previous systems made policy decisions based solely on the subscriber's account settings and account balance, and the overall usage of the network resources was not considered in the policy decisions due to the unavailability of such information in real-time. In sharp contrast, a system operating according to the presently disclosed methods and operations can use the active subscriber count in the policy decisions to allow the operator to utilize the network resources in a more optimal way and at the same time provide improved quality of service to the end-users.

For real-time dynamic control of quality of service for data service of each associated subscriber, the operations and methods may operate so that when a subscriber uses the particular service, the PCRF will use the count fetched from the count database node and other subscriber account data from the OCS in the policy tree in order to determine what quality service shall be applied. In this manner, the available bandwidth can be shared equally between associate subscribers and network congestion may be avoided.

For limiting the number of concurrent subscribers using the service in real-time, the core network element or the PCEF can directly fetch the count of active subscribers from the count database node. When the subscriber makes a call, the core network element or the PCEF will already check the count of the associate subscribers and decide whether or not to allow the call or service to the subscriber. If the threshold has been reached, the call can be rejected with a message provided to the subscriber to try again later. These operations may ensure that the concurrent number of subscribers that are using the service get a constant bandwidth for data usage while reducing unnecessary signaling towards the OCS and reduce policy control decisions.

System may operate to increase decrease the bandwidth or channels associated with a specific service. Multiple services can be used by subscribers spread across the operator's network. But not all of the services have the same demand at a given point in time. Some services may be used heavily during the evening hours while some other services may be used heavily during the morning hours. However, this usage trend may not be predictable in a way that allows optimal use of available resources for real-time dynamic allocation of bandwidth to the services as needed. However, in accordance some embodiments, based on active subscriber count obtained from the count database node, the PCEF or other core network elements can take the bandwidth or channels from the underutilized services and temporarily allocate them to the services which are heavily utilized at a given time. In this manner, real-time resource allocation to the services will guarantee the best service to those subscribers and may also optimize utilization of network resources.

Figure 11:
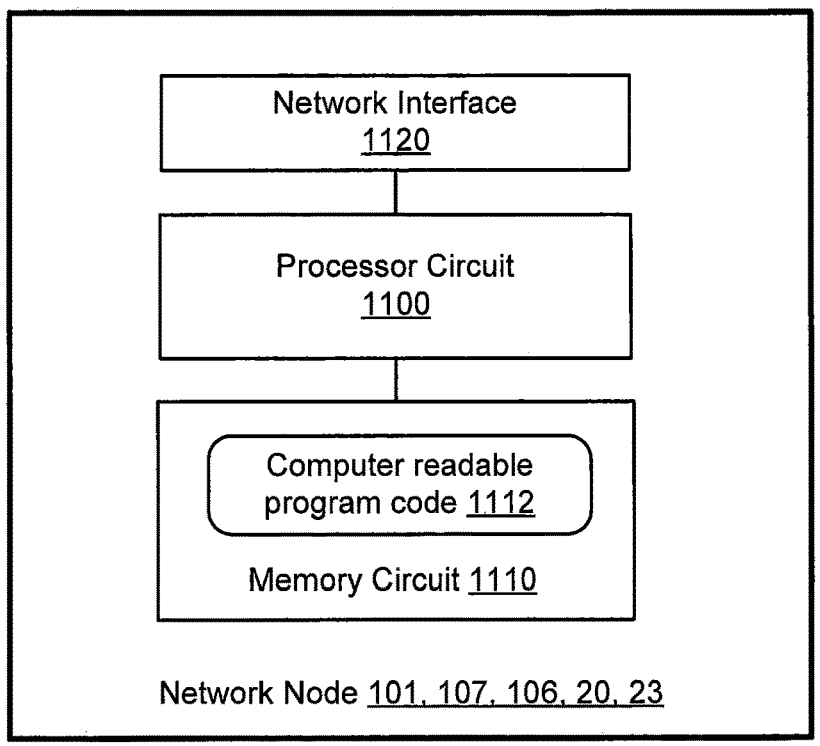
FIGS. 11-14 are block diagrams of network nodes and operational modules that may be incorporated into elements of the Policy and Charging Control system of FIG. 1 according to some embodiments of the present disclosure.

Example Network Node:

FIG. 11 is a block diagram of a network node that may be incorporated into the OCS 101, the multi-mediation node 107, the count database node 106, the PCRF 20, the PCEF, or other elements of the PCC system 10 to operate according to one or more embodiments disclosed herein for the respective element. The network node includes a network interface 1120, a processor circuit 1100, and a memory circuit 1110 containing computer readable program code 1112.

The network interface 1120 is configured to communicate with one or more other elements of the PCC system 10 as disclosed herein. The processor circuit 1100 may include one or more data processing circuits, such as a general purpose and/or special purpose processor, e.g., microprocessor and/or digital signal processor, which may be collocated or distributed across one or more networks. The processor circuit 1100 is configured to execute computer program instructions from the computer readable program code 1112 stored in the memory circuit 1110 to perform at least some of the operations and methods described herein as being performed by the respective network node.

Figure 12:
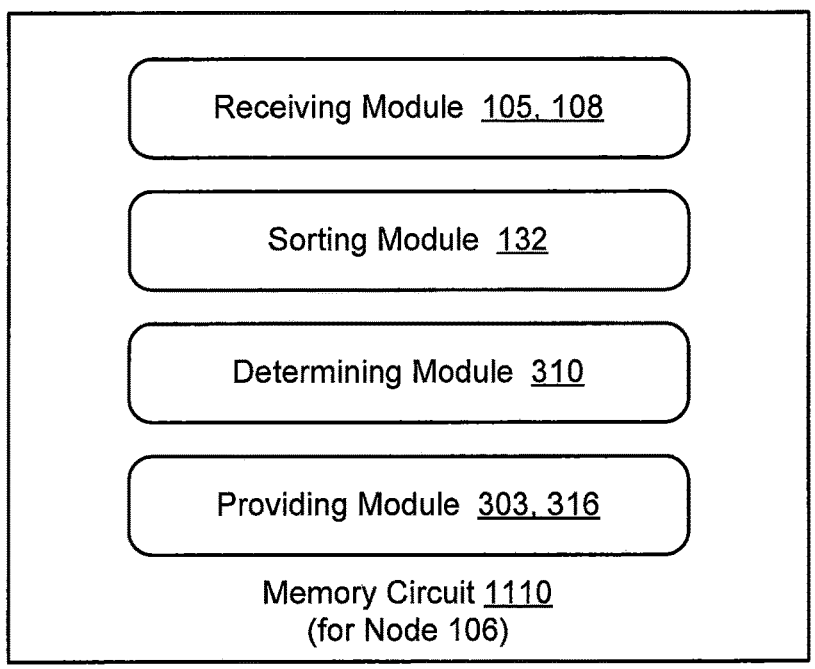

FIG. 12 illustrates a memory circuit 1110 containing modules that may be configured for operation as the count database node 106 is disclosed herein. The modules include a receiving module that operates as disclosed in steps 105 and/or 108, a sorting module that operates according to step 132, a determining module that operates according to step 310, and a providing module that operates according to steps 303 and/or 316 as described above.

Figure 13:
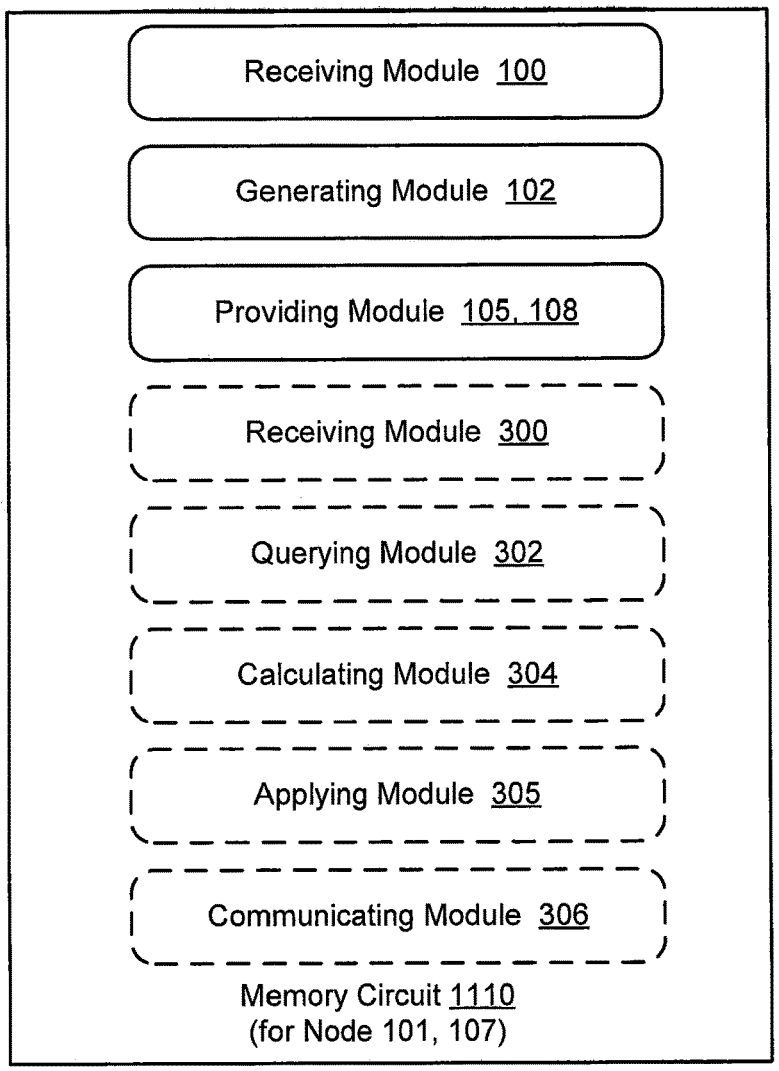

FIG. 13 illustrates a memory circuit 1110 containing modules that may be configured for operation as the OCS 101 and/or the multi-mediation node 107 as disclosed herein. The modules include a receiving module that operates according to step 100, a generating module that operates according to step 102, and a providing module that operates according to steps 105 and/or 108 as described above. The modules may further include a receiving module that operates according to step 300, a querying module that operates according the step 302, a calculating module that operates according to step 304, an applying module that operates according to step 305, and a communicating module that operates according to step 306 as described above.

Figure 14:
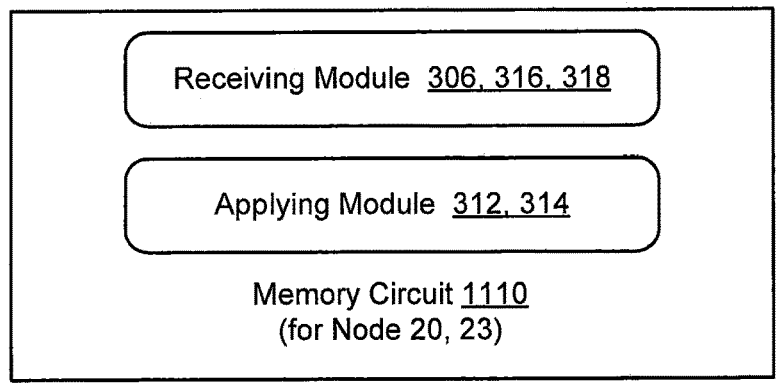

FIG. 14 illustrates a memory circuit 1110 containing modules that may be configured for operation as the PCRF 20 and/or the PCEF 23 as disclosed herein. The modules include a receiving module that operates according to steps 306, 316, and/or 318, and an applying module that operates according to steps 312 and/or 314 as described above.

The network node of FIG. 11 can be configured as the count database node 106 for monitoring content of subscriber accounts processed by an online charging system 101 in a communication network for user equipment nodes 32. The count database node 106 includes a network interface 1120 configured to communicate with the online charging system 101, and a processor 1100 coupled with the network interface. The processor 1100 is configured to receive (step 105 or 108) by the count database node 106 a plurality of data records, each data record containing a subscriber identifier and an attribute to be provisioned for the subscriber. For each of the data records, the processor 1100 sorts (step 132) the data record for storage in database structures 200 maintained by the count database node (106) based on the attribute of the data record. The processor 1100 determines (step 310) a count value based on a number of the data records stored in the database structures 106 maintained by the count database node 106 containing an attribute defined by a query received (step 302 or 312) by the count database node 106, and provides (step 303 or 312) the count value from the count database node 106 to another node (101 or 20).

The network node of FIG. 11 can be configured as the OCS 101 and/or the multi-mediation node 107 in a communication network for monitoring content of subscriber accounts for UEs 32. The OCS 101 and/or the multi-mediation node 107 includes a network interface 1120 configured to communicate with other network nodes, and a processor 1100 coupled with the network interface 1120. The processor 1100 is configured to receive (step 100) data contained in a provisioning request to provision an attribute for use by the subscriber account having a subscriber identifier, and generate (step 102) based on the data contained in the provisioning request, a data record containing the subscriber identifier for the subscriber account and containing the attribute to be provisioned. The processor 1100 is further configured to provide (step 105 or 108) the data record to a count database node 106 via the network interface 1120 for sorting of the data record for storage in a database structure 200 maintained by the count database node 106 based on the attribute of the data record.

The network node of FIG. 11 can be configured as the policy and charging node 20 or 23 in a communication network. The policy and charging node 20 or 23 includes a network interface 1120 configured to communicate with other network nodes, and a processor 1100 coupled with the network interface 1100. The processor 1100 is configured to receive (steps 306, 316, 318) a count value indicating a number of data records having a defined attribute that are stored in a database structure 106 maintained by a count database node 106, and apply (steps 312, 314) a policy that controls use of the service related to the attribute by the user equipment nodes 32 based on the count value.

Abbreviations

Db Database
OCS Online Charging System
MM Multi-Mediation
CDR Call Detail Record
O/P Output
HTTP Hypertext Transfer Protocol
XML Extensible Markup Language
LDAP Lightweight Directory Access Protocol
SQL Sequential Query Language
QoS Quality of Service
PCEF Policy and Charging Enforcement Function
PCRF Policy and Charging Rule Function
GGSN Gateway GPRS Support Node
MSISDN Mobile Subscriber Integrated Service Digital Network Number Further Definitions and Embodiments In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When a node is referred to as being "connected", "coupled", "responsive", or variants thereof to another node, it can be directly connected, coupled, or responsive to the other node or intervening nodes may be present. In contrast, when a node is referred to as being "directly connected", "directly coupled", "directly responsive", or variants thereof to another node, there are no intervening nodes present. Like numbers refer to like nodes throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but does not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method performed by a count database node of a communication network that monitors content of subscriber accounts processed by an online charging system in the communication network, the communication network providing communication services to user equipment nodes operating in the communication network and associated with the subscriber accounts, the method comprising:

receiving, at the count database node, a plurality of update requests, each update request containing a subscriber identifier and an attribute of a type of communication service to be provisioned by the communication network for a user equipment node associated with the subscriber identifier, wherein at least some of the update requests received by the count database node further contain a start time when the attribute of the communication service will become active for use by the user equipment in the communication network and an expiry time when the attribute of the communication service will become inactive for the user equipment in the communication network, wherein the start time when the attribute of the communication service will become active for use by the user equipment is after a current-time;

for each of the update requests, sorting data records for storage in database structures maintained by the count database node based on the attribute of the type of communication service of the update request;

receiving, at the count database node, a query from a network node of the communication network, the query comprising a request for a real-time count value of a number of active subscribers that are using the type of communication service across the communication network;

responsive to receiving the query, determining the real-time count value based on the number of the data records stored in the database structures maintained by the count database node containing the attribute of the type of communication service provisioned by the communication network; and communicating the real-time count value to the network node.

2. The method according to claim 1, wherein the step of receiving, at the count database node, the plurality of update requests, comprises:

receiving the update requests from the online charging system through structured query language messaging or extensible markup language messaging.

3. The method according to claim 1, wherein the step of receiving, at the count database node, the plurality of update requests, comprises:

receiving the update requests from a multi-mediation node of the communication network through structured query language messaging or extensible markup language messaging, the update requests received from the multi-mediation node are based on data records containing subscriber account data associated with the user equipment provided by the online charging system to the multi-mediation node.

4. The method according to claim 1, wherein the step of determining the count value further comprises:
determining the real-time count value based on how many of the data records stored in the database structures contain the attribute, the start time before a current time, and further contain an expiry time when the attribute of the communication service will become inactive that is within a predetermined time period after the current time which indicates the communication service is currently active for the user equipment within the predetermined time period.

5. The method according to claim 1, further comprising the step of purging expired ones of the data records from the database structures maintained by the count database node based on a comparison of the expiry times to the current time, in which the comparison indicates the attributes have become inactive.

6. The method according to claim 1, further comprising sorting an order of the data records stored in the database structures maintained by the count database node based on the start time when the attribute of the communication service of the data record will become active for use by the user equipment in the communication network and then based on the expiry time when the attribute of the communication service of the data record will become inactive for the user equipment in the communication network.

7. The method according to claim 6, further comprising:
following the sorting of the order of the data records stored in the database structures based on the start time and then based on the expiry time, further sorting the order of the data records stored in the database structures maintained by the count database node based on the subscriber identifier.

8. The method according to claim 7, wherein the subscriber identifier comprises a Mobile Station International Subscriber Directory Number (MSISDN) and/or International Mobile Subscriber Identity (IMSI).

9. The method according to claim 1, wherein:
the network node comprises a network node of the online charging system;
the query comprises a services query received from the online charging system;
the step of communicating the real-time count value to the network node comprises:
communicating the count value to the network node of the online charging system responsive to the services query.

10. The method according to claim 1, wherein:
the network node comprises a policy and charging rules function node that controls the quality of the communication services provided in the communication network;
the query is received from the policy and charging rules function node;
the step of communicating the real-time count value to the network node comprises:
communicating the count value to the policy and charging rules function node responsive to the query.

11. A count database node of a communication network that monitors content of subscriber accounts processed by an online charging system in the communication network, the communication network providing communication services to user equipment nodes operating in the communication network and associated with the subscriber accounts, the count database node comprising:
a network interface configured to communicate with the online charging system; and
a processor coupled with the network interface, wherein the processor is configured to:
receive, at the count database node, a plurality of update requests, each update request containing a subscriber identifier and an attribute of a type of communication service to be provisioned by the communication network for a user equipment node associated with the subscriber identifier, wherein at least some of the update requests received by the count database node further contain a start time when the attribute of the communication service will become active for use by the user equipment in the communication network and an expiry time when the attribute of the communication service will become inactive for the user equipment in the communication network, wherein the start time when the attribute of the communication service will become active for use by the user equipment is after a current-time;
for each of the update requests, sort data records for storage in database structures maintained by the count database node based on the attribute of the type of communication service of the update request;
receive, at the count database node, a query from a network node of the communication network, the query comprising a request for a real-time count value of a number of active subscribers that are using the type of communication service across the communication network;
responsive to the receipt of the query, determine the real-time count value based on the number of the data records stored in the database structures maintained by the count database node containing the attribute of the type of communication service provisioned by the communication network; and
communicate the real-time count value to the network node.

12. The count database node of claim 11, wherein the network interface comprises a Sy interface; and
wherein the network node comprises a Policy and Charging Rules Function (PCRF) node of a Policy and Charging Control (PCC) System of the communication network.

13. The method of claim 1, wherein sorting the data records for storage in database structures maintained by the count database node based on the attribute of the type of communication service of the update request comprises sorting the data records near real-time when provisioning of the communication service is provided to the user equipment in the communication network.

14. The method of claim 1, wherein the update requests comprise information provided in provisioning requests received by an Online Charging System (OCS) of the communication network.

15. A computer program product comprised on a non-transitory computer readable medium of a count database node of a communication network that monitors content of subscriber accounts processed by an online charging system in the communication network, the communication network providing communication services to user equipment nodes operating in the communication network and associated with the subscriber accounts, the computer program product comprising executable instructions that when executed by a processor of the count database node causes the processor to perform operations comprising:
receiving, at the count database node, a plurality of update requests, each update request containing a subscriber identifier and an attribute of a type of communication service to be provisioned by the communication network for a user equipment node associated with the subscriber identifier, wherein at least some of the update requests received by the count database node further contain a start time when the attribute of the communication service will become active for use by the user equipment in the communication network and an expiry time when the attribute of the communication service will become inactive for the user equipment in the communication network, wherein the start time when the attribute of the communication service will become active for use by the user equipment is after a current-time;

for each of the update requests, sorting data records for storage in database structures maintained by the count database node based on the attribute of the type of communication service of the update request;

receiving, at the count database node, a query from a network node of the communication network, the query comprising a request for a real-time count value of a number of active subscribers that are using the type of communication service across the communication network;

responsive to receiving the query, determining the real-time count value based on the number of the data records stored in the database structures maintained by the count database node containing the attribute of the type of communication service provisioned by the communication network; and communicating the real-time count value to the network node.

16. The count database node according to claim 11, wherein the processor is further configured to sort an order of the data records stored in the database structures maintained by the count database node based on the start time when the attribute of the communication service of the data record will become active for use by the user equipment in the communication network and then based on the expiry time when the attribute of the communication service of the data record will become inactive for the user equipment in the communication network.

17. The count database node according to claim 16, wherein the processor is further configured to follow the sorting of the order of the data records stored in the database structures based on the start time and then based on the expiry time, further sorting the order of the data records stored in the database structures maintained by the count database node based on the subscriber identifier.

18. The count database node according to claim 17, wherein the subscriber identifier comprises a Mobile Station International Subscriber Directory Number (MSISDN) and/or International Mobile Subscriber Identity (IMSI).

19. The computer program product according to claim 15, further comprising executable instructions that when executed by a processor of the count database node causes the processor to perform operations comprising:

sorting an order of the data records stored in the database structures maintained by the count database node based on the start time when the attribute of the communication service of the data record will become active for use by the user equipment in the communication network and then based on the expiry time when the attribute of the communication service of the data record will become inactive for the user equipment in the communication network; and following the sorting of the order of the data records stored in the database structures based on the start time and then based on the expiry time, further sorting the order of the data records stored in the database structures maintained by the count database node based on the subscriber identifier.

20. The computer program product according to claim 19, wherein the subscriber identifier comprises a Mobile Station International Subscriber Directory Number (MSISDN) and/or International Mobile Subscriber Identity (IMSI).

* * * * *